(12) United States Patent
Zhevelev et al.

(10) Patent No.: US 8,017,913 B2
(45) Date of Patent: Sep. 13, 2011

(54) PASSIVE INFRARED DETECTORS

(75) Inventors: Boris Zhevelev, Rishon Lezion (IL);
Yaacov Kotlicki, Ramat Gan (IL)

(73) Assignee: Visonic Ltd., Tel Aviv-Yafo (IL)

( * ) Notice: Subject to any disclaimer, the term of this patent is extended or adjusted under 35 U.S.C. 154(b) by 28 days.

(21) Appl. No.: 12/374,084

(22) PCT Filed: Jul. 19, 2007

(86) PCT No.: PCT/IL2007/000915
§ 371 (c)(1),
(2), (4) Date: Apr. 30, 2009

(87) PCT Pub. No.: WO2008/012805
PCT Pub. Date: Jan. 31, 2008

(65) Prior Publication Data
US 2009/0309029 A1    Dec. 17, 2009

Related U.S. Application Data

(60) Provisional application No. 60/834,367, filed on Jul. 27, 2006.

(51) Int. Cl.
*G01J 5/08* (2006.01)
(52) U.S. Cl. ........................................ 250/353
(58) Field of Classification Search .................. 250/342, 250/349, 353, 338.1; 340/567; 359/360
See application file for complete search history.

(56) References Cited

U.S. PATENT DOCUMENTS

| 3,949,259 | A | | 4/1976 | Kostlin et al. | |
|---|---|---|---|---|---|
| 3,958,118 | A | | 5/1976 | Schwarz | |
| 4,048,980 | A | * | 9/1977 | Googin et al. | 126/661 |
| 4,055,707 | A | * | 10/1977 | McDonald | 428/652 |
| 4,058,726 | A | | 11/1977 | Paschedag et al. | |
| 4,081,680 | A | | 3/1978 | Keller | |
| 4,087,688 | A | | 5/1978 | Keller | |
| 4,199,218 | A | | 4/1980 | Steinhage et al. | |
| 4,225,786 | A | * | 9/1980 | Perlman | 250/342 |
| 4,242,669 | A | | 12/1980 | Crick | |
| 4,245,217 | A | | 1/1981 | Steinhage | |
| 4,271,359 | A | | 6/1981 | Herwig et al. | |
| 4,321,594 | A | | 3/1982 | Galvin et al. | |
| 4,342,987 | A | | 8/1982 | Rossin | |
| 4,375,034 | A | | 2/1983 | Guscott | |

(Continued)

FOREIGN PATENT DOCUMENTS
EP            0481934 A1    4/1992
(Continued)

OTHER PUBLICATIONS http://www.crowelec.com.
(Continued)

*Primary Examiner* — Constantine Hannaher
*Assistant Examiner* — Marcus Taningco
(74) *Attorney, Agent, or Firm* — Fish & Richardson P.C.

(57) ABSTRACT

An infrared motion detector including at least one infra-red radiation sensor, at least one radiation reflecting surface, operative to direct radiation impinging thereon towards the at least one infra-red radiation sensor and at least one coating layer, coating the at least one radiation reflective surface, which is substantially reflective to far infra-red radiation and which strongly absorbs at least one of visible light and near infra-red radiation, wherein the at least one coating layer includes black nickel.

26 Claims, 4 Drawing Sheets

U.S. PATENT DOCUMENTS

| | | | |
|---|---|---|---|
| 4,429,224 A | | 1/1984 | Wagli et al. |
| 4,431,708 A | * | 2/1984 | Carver et al. ............... 428/641 |
| 4,479,056 A | | 10/1984 | Zierhut et al. |
| 4,594,995 A | * | 6/1986 | Garrison ..................... 126/569 |
| 4,604,524 A | | 8/1986 | Kotlicki et al. |
| 4,614,938 A | | 9/1986 | Weitman |
| 4,645,930 A | | 2/1987 | Zierhut et al. |
| 4,704,533 A | | 11/1987 | Rose et al. |
| 4,709,152 A | | 11/1987 | Muller et al. |
| 4,709,153 A | | 11/1987 | Schofield |
| 4,746,910 A | | 5/1988 | Pfister et al. |
| 4,751,396 A | | 6/1988 | Daigle et al. |
| 4,752,768 A | | 6/1988 | Steers et al. |
| 4,772,875 A | | 9/1988 | Maddox et al. |
| 4,787,722 A | | 11/1988 | Claytor |
| 4,912,748 A | | 3/1990 | Horii et al. |
| 4,914,283 A | | 4/1990 | Brinckmann et al. |
| 4,943,800 A | | 7/1990 | Ikeda et al. |
| 4,982,094 A | | 1/1991 | Matsuda |
| 5,077,549 A | | 12/1991 | Hershkovitz et al. |
| 5,243,326 A | | 9/1993 | Disabato |
| 5,268,680 A | | 12/1993 | Zantos |
| 5,296,707 A | | 3/1994 | Nozu et al. |
| 5,424,718 A | | 6/1995 | Muller et al. |
| 5,465,080 A | | 11/1995 | Liddiard et al. |
| 5,475,367 A | | 12/1995 | Prevost et al. |
| 5,559,496 A | | 9/1996 | Dubats |
| 5,570,079 A | | 10/1996 | Dockery |
| 5,572,033 A | * | 11/1996 | Grant ......................... 250/353 |
| 5,608,220 A | | 3/1997 | Wieser et al. |
| RE35,534 E | | 6/1997 | Claytor |
| 5,693,943 A | | 12/1997 | Tchernihovski et al. |
| 5,703,368 A | | 12/1997 | Tomooka et al. |
| 5,712,622 A | | 1/1998 | Grossinger et al. |
| 5,757,270 A | | 5/1998 | Mori et al. |
| 5,834,765 A | | 11/1998 | Ashdown et al. |
| 5,844,240 A | | 12/1998 | Lee et al. |
| 5,929,445 A | | 7/1999 | Barone |
| 5,942,976 A | * | 8/1999 | Wieser et al. ............... 340/565 |
| 5,963,131 A | | 10/1999 | D'Angelo et al. |
| 6,031,456 A | | 2/2000 | Hanyuda et al. |
| 6,078,253 A | | 6/2000 | Fowler |
| 6,150,658 A | | 11/2000 | Hagiwara et al. |
| 6,163,025 A | | 12/2000 | Pantus et al. |
| 6,211,522 B1 | | 4/2001 | Kotlicki et al. |
| 6,222,191 B1 | | 4/2001 | Myron et al. |
| 6,239,437 B1 | | 5/2001 | Barone |
| 6,262,661 B1 | | 7/2001 | Mahler et al. |
| 6,324,008 B1 | | 11/2001 | Baldwin et al. |
| 6,377,174 B1 | | 4/2002 | Siegwart et al. |
| 6,415,205 B1 | | 7/2002 | Myron et al. |
| 6,469,625 B1 | | 10/2002 | Tomooka |
| 6,529,129 B1 | | 3/2003 | Tomooka |
| 6,653,635 B2 | | 11/2003 | Liao et al. |
| 6,690,018 B1 | | 2/2004 | Barone |
| 6,756,595 B2 | | 6/2004 | Barone |
| 6,818,881 B1 | | 11/2004 | Chernichovski et al. |
| 6,822,788 B2 | | 11/2004 | Blitstein |
| 7,008,063 B2 | | 3/2006 | Porter et al. |
| 6,215,399 B1 | | 5/2006 | Barone |
| 7,053,374 B2 | | 5/2006 | Barone |
| 7,075,431 B2 | | 7/2006 | Buckley et al. |
| 7,115,871 B1 | | 10/2006 | Tracy et al. |
| 2003/0156027 A1 | | 8/2003 | Seo |
| 2004/0200955 A1 | | 10/2004 | Andzelevich |
| 2005/0030180 A1 | | 2/2005 | Pantus et al. |
| 2005/0045826 A1 | | 3/2005 | Barone |
| 2005/0236572 A1 | | 10/2005 | Micko |

FOREIGN PATENT DOCUMENTS

| | | |
|---|---|---|
| EP | 0499177 A1 | 8/1992 |
| JP | 08240482 A | 9/1996 |
| WO | 2007090458 | 8/2007 |

OTHER PUBLICATIONS http://www.optex.com.
http://www.paradox.ca.
An Examination Report dated Feb. 2, 2011, which issued during the prosecution of Applicants UK Patent Application No. 1010004.8.

* cited by examiner

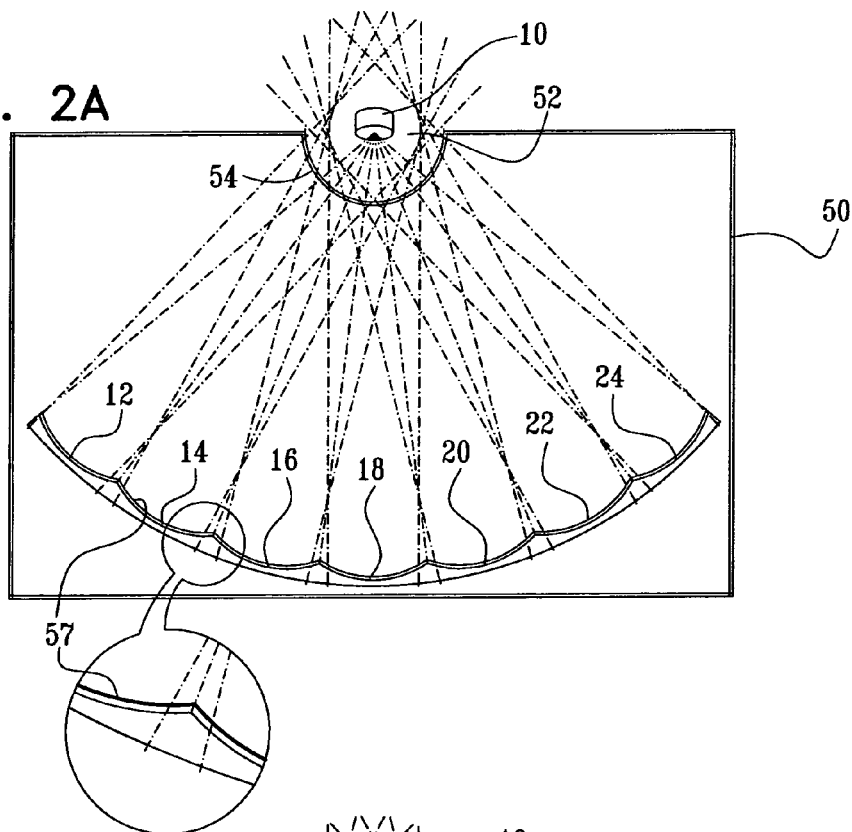
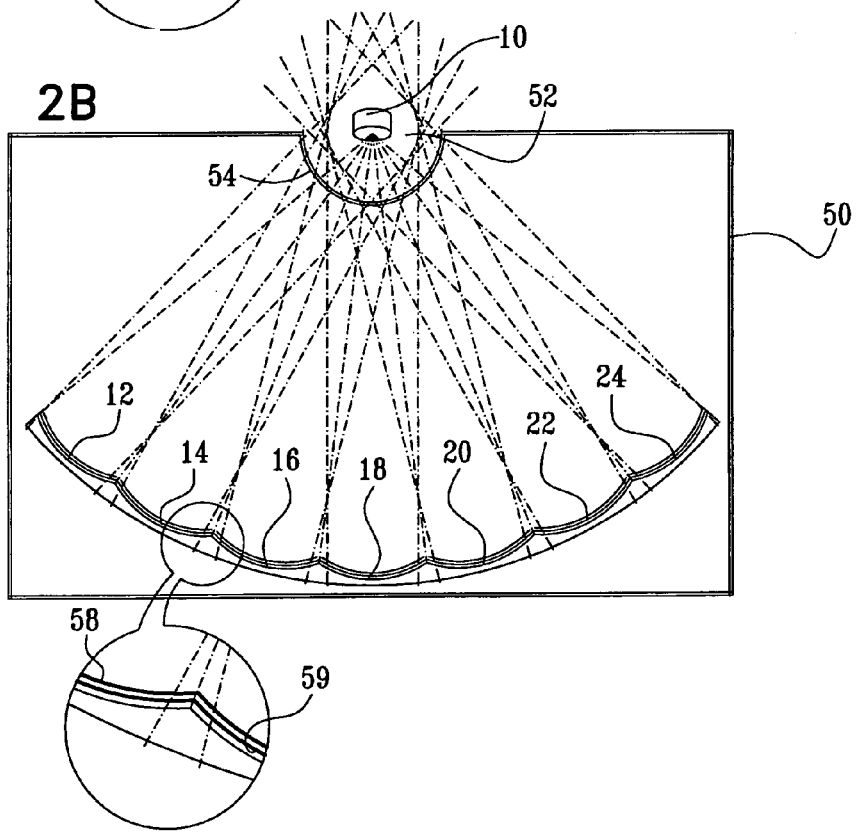

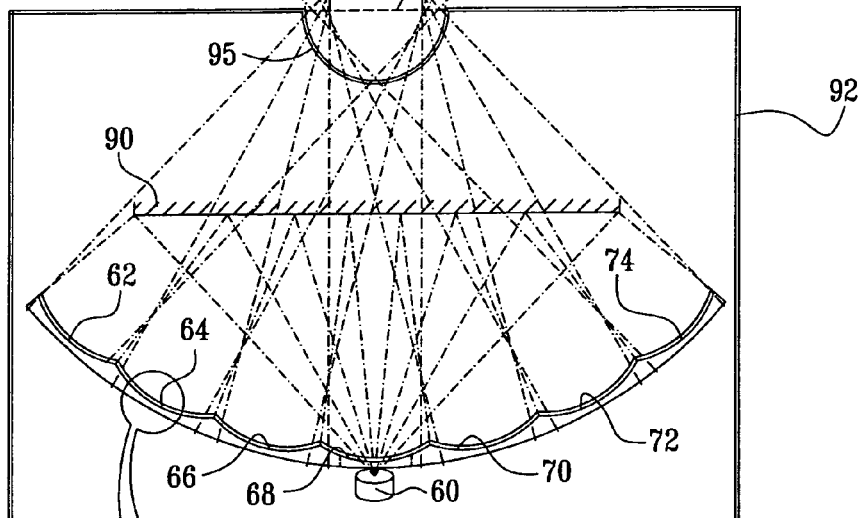
FIG. 4A
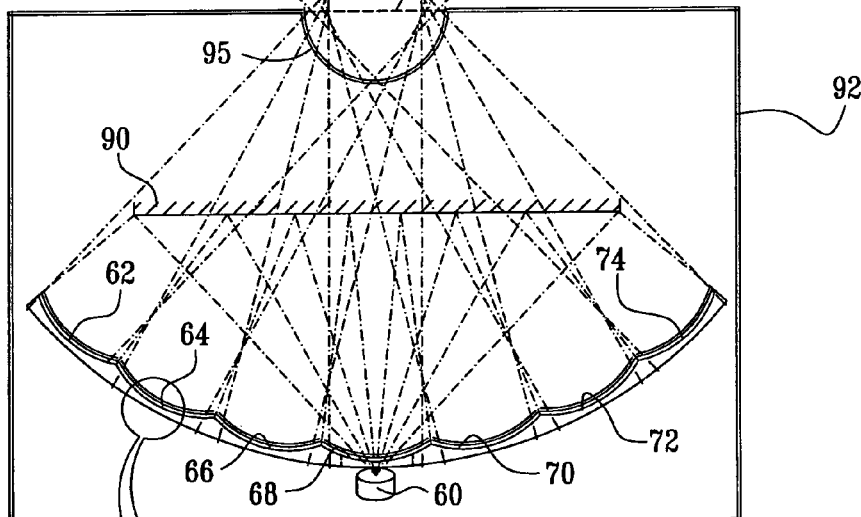
FIG. 4B
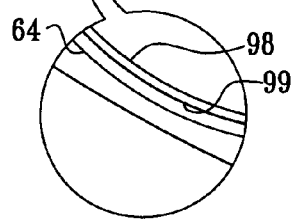

PASSIVE INFRARED DETECTORS

CROSS REFERENCE TO PRIOR APPLICATIONS

This is the U.S. National Phase application under 35 U.S.C. §371 of International Patent Application No. PCT/IL2007/000915, filed Jul. 19, 2007, and claims the benefit of U.S. Provisional Application No. 60/834,367, filed Jul. 27, 2006 both of which are incorporated by reference herein. The International Application published in English on Jan. 31, 2008 as WO 2008/012805 under PCT Article 21(2).

REFERENCE TO RELATED APPLICATIONS

Reference is hereby made to U.S. Provisional Patent Application Ser. No. 60/834,367, filed Jul. 27, 2006, entitled PASSIVE INFRA-RED DETECTORS, the contents of which is hereby incorporated by reference and priority of which are hereby claimed pursuant to 37 CFR 1.78(a) (4) and (5)(i).

FIELD OF THE INVENTION

The present invention relates to passive infrared detectors generally.

BACKGROUND OF THE INVENTION

The present invention relates to passive infrared motion detectors used for detection of motion of human targets moving in a spatial region monitored by the detector, by sensing far infrared radiation emanating from the targets. Such detectors contain an optical system, such as a reflective mirror device, which directs and focuses the infrared radiation from one or more detection fields-of-view or zones thereof. The detection fields-of-view or zones monitor the spatial region and pass through an infrared transparent window into the detector housing and onto one or more infrared radiation sensors, located within the motion detector.

The design of the optical system is usually based on the use of one or more optical elements, such as mirror segments, arranged in one or more rows, each row including one or more segments. The segments within the rows are arranged with their optical axes spread azimuthally in a plane, generally parallel to the horizontal, or inclined with respect to the horizontal.

Each of the segments is arranged to focus infrared energy emanating from a pre-defined detection zone onto an infrared radiation sensor such as a pyroelectric sensor, which is common to one or more segments. The combined detection zones of the multiple optical elements or segments, constitute the field-of-view of the detector, which is defined as the detection region covered by the detector or the "coverage" of the detector.

The mirrors are normally formed of plastic base such as Acrylonitrile Butadiene Styrene (ABS), preferably by injection molding or vacuum forming and are then coated with bright nickel or bright chrome as known in the art.

In such detectors, incoming infrared radiation enters the detector through an infrared transparent window in the detector housing and is reflected by the mirror segments to focus onto a pyroelectric sensor. The window is provided to prevent insects and other spurious matter from entering the detector.

A person moving through the field-of-view of the detector emits far infrared radiation having wavelength of 7-14 μm and causes the generation of a signal output from the infrared radiation sensor. This signal caused by a moving person is defined to be a "desired signal". Signal processing circuitry of the detector detects and processes the desired signal and activates an alarm signal output when certain criteria are met.

Infrared motion sensors of the type described hereinabove are typically subjected to various sources of "undesired" radiation during their operation, such as radiation emitted by strong light sources. Furthermore, motion sensors using mirrored optics are generally unprotected from various undesired wavelengths of incoming radiation.

As a result, the "undesired" radiation reaches the mirror surface and is then reflected and focused onto the infra-red radiation sensor causing generation of "undesired signals", which may cause false alarms and/or other inaccurate detection events.

Sunlight, as well as tungsten/halogen lamps, such as automobile headlights, produces one type of undesired radiation that is known to promote false alarms in infrared motion sensors. These radiation sources emit strong radiation in both the visible and the near infrared spectrum. Accordingly, compliance testing of infrared motion sensors in various countries often involves the use of a halogen light source at fairly intense levels (e.g., 2000 to 6000 lux) to determine the immunity of the motion sensor to this type of radiation.

Various solutions have been provided to minimize the effect of these undesired radiations.

The following published patent documents and other publications are believed to represent the current state of the art:
U.S. Pat. Nos. 3,949,259; 4,199,218; 4,245,217; 4,321,594; 4,342,987; 5,424,718; 5,712,622; 5,608,220 and 6,822,788.

SUMMARY OF THE INVENTION

The objective of the present invention is to provide a passive infra-red detector based on a reflecting mirror device, which is substantially immune to false alarms caused by undesired radiation in both the visible and the near infra-red spectrum, substantially without loosing its sensitivity to the desired far infra-red radiation having wavelengths of 7-14 μm.

For accomplishing this objective the reflecting surfaces of the mirror device are coated preferably with a selective absorbing material, such as black nickel. Black nickel strongly absorbs visible light and near infrared radiation having wavelengths shorter than 2 μm. At the same time the black nickel coating is substantially reflective to far infrared radiation, having wavelengths of 7-14 μm, thereby acting as a selective filter.

When compared to mirror devices coated with bright nickel or bright chrome as known in the art, mirror devices coated with black nickel are found to reflect far infra-red radiation substantially at the same level as bright nickel or bright chrome but at the same time to reduce the "undesired signals" caused by visible light and near infra-red radiation by 80%-90% compared to mirror devices coated with bright nickel or bright chrome.

Another preferred coating is the black chrome coating which provides similar selective filtering properties as black nickel. Black nickel and black chrome coatings are provided by a simple electroplating process, similar to processes used for bright nickel and bright chrome coatings of the mirrors known in the art. Furthermore, mirror devices coated with black nickel and black chrome are resistant to environmental conditions and therefore do not need to be coated with any protective coating such as other selective coatings.

The reflectivity to far infrared radiation and the absorbance of visible light and near infrared radiation of a mirror device coated with black nickel or black chrome may vary with the thickness of the coating. The preferred thickness may vary in the range of 0.2 to 10 micron depending on the type of electroplating bath and other plating parameters such as temperature, current, PH and the like. Furthermore, when varying the coating thickness of the black nickel, it is seen that at a certain thickness, the reflectivity of the far infra-red radiation of a mirror coated with black nickel was better, compared to the same mirror, coated with bright nickel or bright chrome as known in the art, without losing its absorbance to visible light and near infra-red radiation.

There are other coatings that may be used together with or instead of black nickel or black chrome such as black copper, black zinc, black cobalt or iron oxide.

There is thus provided in accordance with a preferred embodiment of the present invention an infrared motion detector including at least one infra-red radiation sensor, at least one radiation reflecting surface, operative to direct radiation impinging thereon towards the at least one infra-red radiation sensor and at least one coating layer, coating the at least one radiation reflective surface, which is substantially reflective to far infra-red radiation and which strongly absorbs at least one of visible light and near infra-red radiation, wherein the at least one coating layer includes black nickel.

In accordance with a preferred embodiment of the present invention the at least one coating layer includes black chrome. Preferably, the at least one coating layer includes at least one of black copper, black zinc, black cobalt and iron oxide. Additionally or alternatively, the at least one coating layer is deposited onto a reflective coating layer.

In accordance with another preferred embodiment of the present invention the reflective coating layer includes at least one of nickel, chrome, silver, aluminum, copper, steel, and gold. Preferably, the reflective coating layer is a highly reflective bright coating layer. Additionally or alternatively, the at least one coating layer has a thickness in the range of 0.2 and 10 microns.

In accordance with yet another preferred embodiment of the present invention the at least one infrared radiation sensor is a pyroelectric sensor. Preferably, the far infrared radiation has wavelengths in the range of 7-14 μm. Additionally or alternatively, the visible light and the near infrared radiation have wavelengths below 2 μm.

In accordance with still another preferred embodiment of the present invention the infrared motion detector also includes at least one intermediate radiation reflective surface located along the optical path of the radiation impinging on the at least one radiation reflective surface and operative to direct the radiation along the optical path toward the at least one infrared sensor. Preferably, the at least one intermediate radiation reflective surface is coated by the at least one coating layer. Alternatively, the at least one radiation reflective surface is not coated by the at least one coating layer.

In accordance with a further preferred embodiment of the present invention the at least one radiation reflective surface includes a focusing mirror for far infrared radiation. Preferably, the at least one intermediate radiation reflective surface includes a non-focusing mirror for far infrared radiation. Additionally or alternatively, the at least one intermediate radiation reflective surface provides optical power for far infrared radiation.

In accordance with a still further preferred embodiment of the present invention, the at least one intermediate radiation reflective surface is formed of a substrate base made of ABS (Acrylonitrile Butadiene Styrene). Preferably, the at least one radiation reflective surface is formed of a substrate base made of ABS (Acrylonitrile Butadiene Styrene).

There is also provided in accordance with another preferred embodiment of the present invention a radiation reflector for use in motion detectors, to direct far infrared radiation towards an infrared radiation sensor, including at least one radiation reflective surface and at least one coating layer coating the radiation reflective surface which is substantially reflective to far infra-red radiation and which strongly absorbs at least one of visible light and near infra-red radiation, wherein the at least one coating layer includes black nickel.

In accordance with a preferred embodiment of the present invention the at least one coating layer includes black chrome. Preferably, the at least one coating layer includes at least one of black copper, black zinc, black cobalt and iron oxide. Additionally or alternatively, the at least one coating layer is deposited onto a reflective coating layer.

In accordance with another preferred embodiment of the present invention the reflective coating layer includes at least one of nickel, chrome, silver, aluminum, copper, steel, and gold. Preferably, the reflective coating layer is a highly reflective bright coating layer. Additionally or alternatively, the at least one coating layer has a thickness in the range of 0.2 and 10 microns.

In accordance with yet another preferred embodiment of the present invention the far infrared radiation has wavelengths in the range of 7-14 μm. Preferably, the visible light and the near infrared radiation have wavelengths below 2 μm. Additionally or alternatively, the at least one radiation reflective surface includes a multi-segmented mirror.

In accordance with still another preferred embodiment of the present invention the at least one radiation reflective surface includes a focusing mirror for far infrared radiation. Alternatively, the at least one radiation reflective surface includes a non-focusing mirror for far infrared radiation. Preferably, the at least one radiation reflective surface is formed of a substrate base made of ABS (Acrylonitrile Butadiene Styrene).

There is further provided in accordance with a further preferred embodiment of the present invention a radiation reflector, for use in motion detectors, to direct far infrared radiation towards an infrared radiation sensor, the radiation reflector including a substrate base made of a plastic material, a first layer of electroless conductive coating plated over at least part of the substrate base and a second layer including black nickel electroplated over the first layer.

In accordance with a preferred embodiment of the present invention the first layer includes electroless nickel or electroless copper. Preferably, the first layer includes a bright finish. Additionally or alternatively, the second layer includes black chrome electroplated over the first layer.

In accordance with another preferred embodiment of the present invention the second layer includes at least one of black copper, black zinc, black cobalt and iron oxide electroplated over the first layer. Preferably, the second layer has a thickness in the range of 0.2 and 10 microns.

In accordance with yet another preferred embodiment of the present invention the radiation reflector also includes an additional layer including bright acid copper electroplated over the first layer, and wherein the second layer is electroplated over the additional layer. Alternatively, the radiation reflector also includes an additional layer including bright nickel electroplated over the first layer, and wherein the second layer is electroplated over the additional layer.

As a further alternative, the radiation reflector also includes a first additional layer including bright acid copper electroplated over the first layer and a second additional layer including bright nickel electroplated over the first additional layer, wherein the second layer is electroplated over the second additional layer. Preferably, the second additional layer includes at least one of chrome, silver, aluminum, copper, steel, and gold, having bright finish electroplated over the second layer.

There is additionally provided in accordance with an additional preferred embodiment of the present invention a method for reducing false alarms in passive infrared motion detectors employing at least one radiation reflective surface in order to direct far infrared radiation impinging thereon towards an infrared radiation sensor, the method including coating the radiation reflective surface by at least one coating layer including black nickel, which at least one coating layer is substantially reflective to far infra-red radiation and which strongly absorbs at least one of visible light and near infra-red radiation.

In accordance with a preferred embodiment of the present invention, the coating includes coating the at least one radiation reflective surface by at least one coating layer including black chrome. Preferably, the coating includes coating the at least one radiation reflective surface with at least one of black copper, black zinc, black cobalt and iron oxide. Additionally or alternatively, the coating includes coating the at least one radiation reflective surface such that the coating layer has a thickness in the range of 0.2 and 10 microns.

In accordance with another preferred embodiment of the present invention the coating the at least one radiation reflective surface includes electroless plating of nickel onto the at least one radiation reflective surface, bright acid copper plating of the at least one radiation reflective surface, bright nickel plating of the at least one radiation reflective surface and black nickel plating of the at least one radiation reflective surface. Alternatively, the coating the at least one radiation reflective surface includes electroless plating of nickel onto the at least one radiation reflective surface, bright acid copper plating of the at least one radiation reflective surface and black nickel plating of the at least one radiation reflective surface.

As a further alternative, the coating the at least one radiation reflective surface includes electroless plating of nickel onto the at least one radiation reflective surface, and black nickel plating of the at least one radiation reflective surface.

BRIEF DESCRIPTION OF THE DRAWINGS

The present invention will be understood and appreciated more fully from the following detailed description, taken in conjunction with the drawings in which:

FIGS. 2A and 2B are simplified sectional illustrations of the detector of FIG. 1 in two alternative configurations, taken along the lines II-II in FIG. 1;

FIGS. 4A and 4B are simplified sectional illustrations of the detector of FIG. 3 in two alternative configurations, taken along the lines IV-IV in FIG. 3.

DETAILED DESCRIPTION OF PREFERRED EMBODIMENTS

Figure 1:
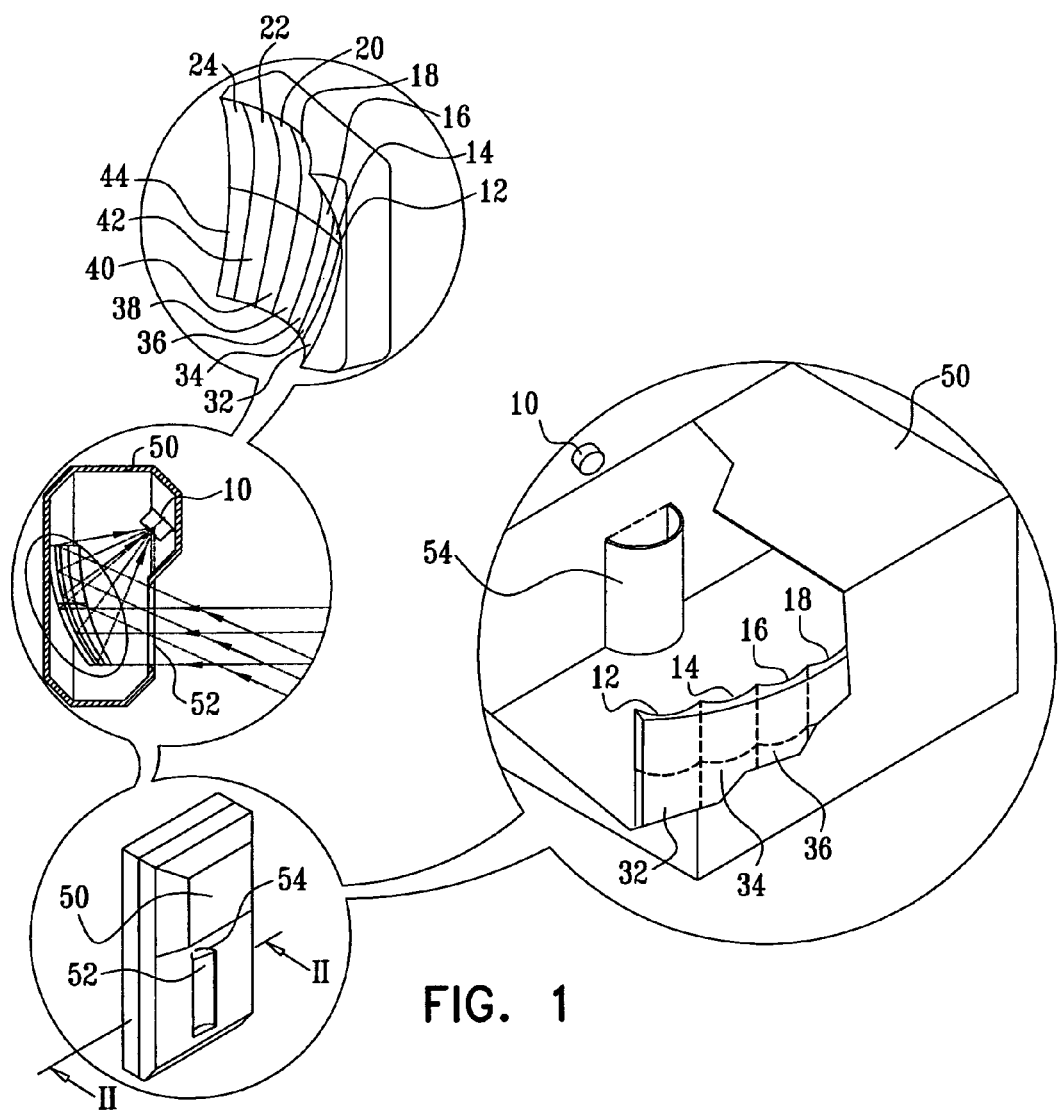
FIG. 1 is a simplified illustration of a detector constructed and operative in accordance with a preferred embodiment of the present invention.

Reference is now made to FIG. 1, which is a simplified pictorial illustration of a mirror-based detector constructed and operative in accordance with a preferred embodiment of the present invention, and to FIGS. 2A and 2B, which are simplified sectional illustrations of the detector of FIG. 1 in two alternative configurations.

As seen in FIG. 1, the detector typically includes a mirror having fourteen mirror segments, each defining a corresponding detection zone of the detector. The mirror segments are arranged in a mutually concave arrangement in two rows.

As seen in the illustrated embodiment, a sensor 10 is associated with mirror segments 12, 14, 16, 18, 20, 22 and 24 in a top row and with mirror segments 32, 34, 36, 38, 40, 42 and 44 in a bottom row. Each of the mirror segments is operative to focus radiation from its corresponding detection zone onto the sensor 10. The mirror segments 12, 14, 16, 18, 20, 22 and 24 preferably are arranged in a concave arrangement in a circular arc within a housing element 50. Similarly, mirror segments 32, 34, 36, 38, 40, 42 and 44 preferably are arranged in a concave arrangement in a circular arc within housing element 50.

The housing element 50 defines an aperture 52 adjacent which is preferably located a window 54 having a circular cross-section. Window 54 preferably is made of a thin material transparent to infrared radiation, such as HDPE, Silicon, Germanium or any other suitable material. Alternatively, other appropriate window shapes may be used.

Sensor 10 preferably comprises a dual element pyroelectric sensor, such as an LHi-968 sensor, commercially available from Perkin-Elmer of Freemont, Calif., USA.

As seen with particular clarity in FIG. 2A, it is a particular feature of the present invention that mirror segments 12, 14, 16, 18, 20, 22 and 24 are coated with a coating layer 57, which is selectively substantially reflective to far infra-red radiation, having wavelengths of 7-14 μm and strongly absorbs visible light and near infra-red radiation having wavelengths shorter than 2 μm. Preferably, the coating layer 57 is formed of black nickel or black chrome. Additionally or alternatively coating layer 57 can also include black copper, black zinc, black cobalt or iron oxide. The coating preferably has a thickness between 0.2 and 10 microns. Preferably, mirror segments 32, 34, 36, 38, 40, 42 and 44 (FIG. 1) are also coated with a coating layer similar to coating layer 57.

In an alternative configuration, as shown in FIG. 2B, the selective layer 57 of FIG. 2A is replaced by a first coating layer 58, formed of black nickel, and preferably having a thickness between 0.2 and 10 microns, deposited onto a reflective coating layer 59, preferably formed of bright nickel. Additionally or alternatively the first coating layer 58 may include black chrome, black copper, black zinc, black cobalt or iron oxide, and the reflective coating layer 59 may be formed of chrome, silver, aluminum, copper, steel or gold, preferably having a bright finish.

In accordance with a preferred embodiment of the present invention, the mirror segments 12, 14, 16, 18, 20, 22, 24, 32, 34, 36, 38, 40, 42 and 44 are formed of a substrate base preferably made of a plastic material, such as Acrylonitrile Butadiene Styrene (ABS), or any other suitable material, preferably by injection molding, vacuum forming, or by any other suitable process.

The mirror segments are then coated or electroplated, preferably by forming a black nickel coating, which functions as first coating layer 58, over bright nickel, which functions as reflective coating layer 59, as shown in FIG. 2B. Reflective coating layer 59 is formed by plating the plastic substrate base with a first conductive layer, such as by electroless nickel plating, followed by electroplating a second layer of bright acid copper over the first conductive layer, further followed by electroplating a third layer of bright nickel over the second layer. This is followed by electroplating a layer of black nickel over the bright nickel third layer, which layer of black nickel functions as first coating layer 58.

Alternatively, the bright nickel third layer may be obviated, and the layer of black nickel may be formed directly over the bright acid copper second layer.

As a further alternative, the bright acid copper layer may also be obviated, and the layer of black nickel may be formed directly over the first conductive layer. Preferably, the first conductive layer is formed by electroless nickel plating or electroless copper, preferably having a bright finish.

Figure 3:
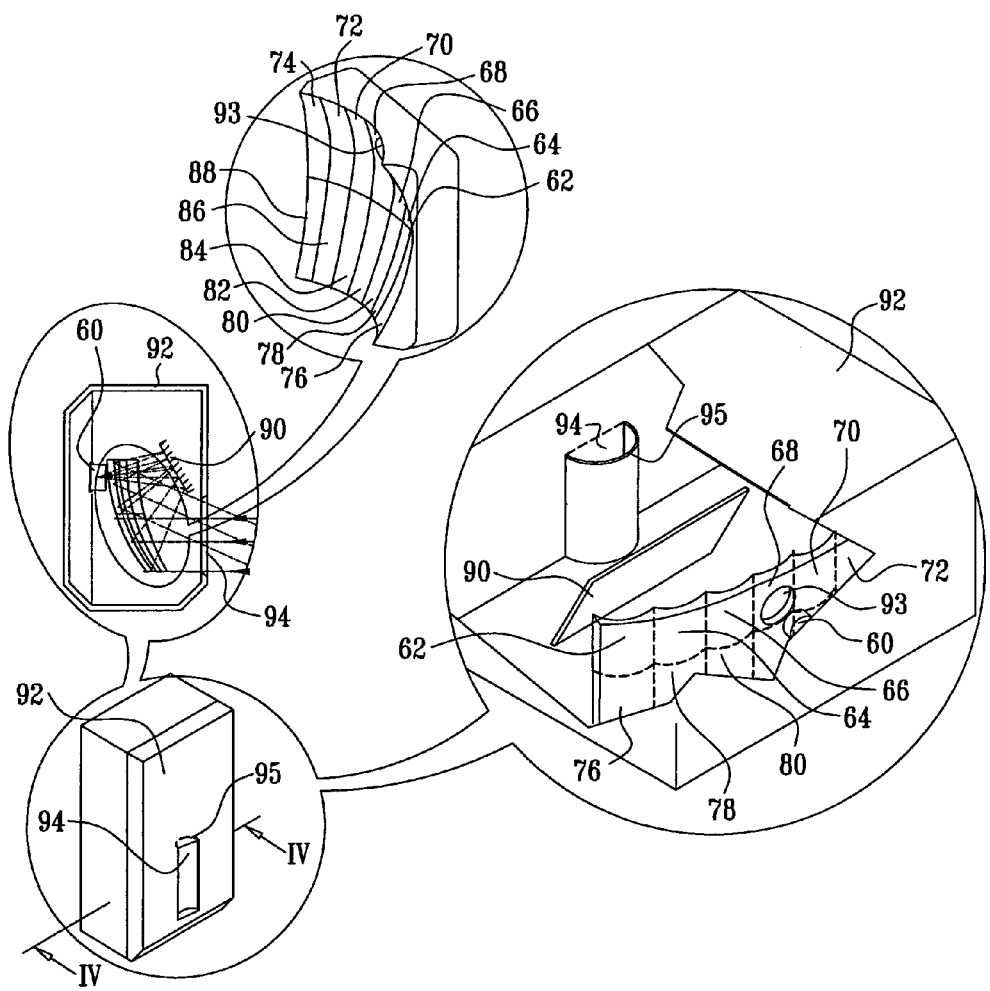
FIG. 3 is a simplified illustration of a detector constructed and operative in accordance with another preferred embodiment of the present invention.

Reference is now made to FIG. 3, which is a simplified pictorial illustration of a mirror-based detector constructed and operative in accordance with another preferred embodiment of the present invention, and to FIGS. 4A and 4B, which are simplified sectional illustrations of the detector of FIG. 3 in two alternative configurations.

As seen in FIGS. 3-4B, the detector typically includes a mirror having fourteen mirror segments, each defining a corresponding detection zone of the detector. The mirror segments are arranged in a mutually concave arrangement in two rows.

As seen in the illustrated embodiment, a sensor, preferably a pyroelectric sensor 60, is associated with mirror segments 62, 64, 66, 68, 70, 72 and 74 in a top row and with mirror segments 76, 78, 80, 82, 84, 86 and 88 in a bottom row. Each of the mirror segments is operative to focus radiation from its corresponding detection zone onto the sensor 60 via at least one intermediate reflecting surface 90. The mirror segments 62, 64, 66, 68, 70, 72 and 74 preferably are arranged in a concave arrangement in a circular arc within a housing element 92. Similarly, mirror segments 76, 78, 80, 82, 84, 86 and 88 preferably are arranged in a concave arrangement in a circular arc within housing element 92.

The sensor 60 may be located at any suitable location within the housing 92. The at least one intermediate reflecting surface 90, here shown as a single intermediate reflecting surface, is located along optical paths defined by mirror segments 62, 64, 66, 68, 70, 72, 74, 76, 78, 80, 82, 84, 86 and 88 at a location suitable for redirecting radiation from the mirror segments to pyroelectric sensor 60.

In the illustrated embodiment of FIGS. 3-4B, the sensor 60 is shown mounted at an aperture 93 in mirror segment 68. It is appreciated that alternatively, the sensor 60 may be located rearward of the aperture, and in such a case may be mounted on a circuit board (not shown) which also mounts the mirror segments. In such a case, intermediate reflecting surface 90 may require some optical power.

The housing element 92 defines aperture 94 adjacent which is preferably located a window 95, having a circular cross-section. Window 95 preferably is made of a thin material transparent to infrared radiation, such as HDPE, Silicon, Germanium or any other suitable material. Alternatively, other appropriate window shapes, such as a flat window, may be used.

Sensor 60 preferably comprises a dual element pyroelectric sensor, such as an LHi-968 sensor, commercially available from Perkin-Elmer of Freemont, Calif., USA.

As seen with particular clarity in FIG. 4A, it is a particular feature of the present invention that mirror segments 62, 64, 66, 68, 70, 72 and 74 are coated by a coating layer 97, which is selectively substantially reflective to far infra-red radiation, having wavelengths of 7-14 µm, and strongly absorbs visible light and near infra-red radiation, having wavelengths shorter than 2 µm. Preferably, the coating layer 97 is formed of black nickel or black chrome. Alternatively, coating layer 97 can be formed of black copper, black zinc, black cobalt or iron oxide. The coating preferably has a thickness between 0.2 and 10 microns. Additionally, mirror segments 76, 78, 80, 82, 84, 86 and 88 and/or intermediate reflecting surface 90 may also be coated by coating layer 97. In accordance with a preferred embodiment of the present invention, which provides an enhanced radiation selectivity effect, the mirror segments 62, 64, 66, 68, 70, 72, 74, 76, 78, 80, 82, 84, 86 and 88 and one or more intermediate reflecting surfaces, such as intermediate reflecting surface 90, are coated by coating layer 97.

It is appreciated that not all the mirror segments and/or intermediate reflecting surfaces need necessarily be coated with coating layer 97. One may choose to coat only some of the segments or intermediate reflecting surfaces with coating layer 97, such that the segments or intermediate reflecting surfaces which are not coated have a bright reflective coating.

In an alternative configuration, as shown in FIG. 4B, the selective layer 97 of FIG. 4A is replaced by a first coating layer 98, formed of black nickel, and preferably having a thickness between 0.2 and 10 microns, deposited onto a reflective coating layer 99, preferably formed of bright nickel. Additionally or alternatively, the first coating layer 98 may include black chrome, black copper, black zinc, black cobalt or iron oxide, and the reflective coating layer 99 may be formed of chrome, silver, aluminum, copper, steel or gold, preferably having a bright finish.

In accordance with a preferred embodiment of the present invention, the mirror segments 62, 64, 66, 68, 70, 72, 74, 76, 78, 80, 82, 84, 86 and 88, as well as the intermediate reflecting surface 90, are formed of a substrate base preferably made of a plastic material such as ABS or of any other suitable material, preferably by injection molding, vacuum forming, or by any other suitable process. The mirror segments, as well as the intermediate reflecting surface 90, are then coated or electroplated preferably by one of the processes described hereinabove with respect to FIGS. 1-2B.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

The invention claimed is:

1. An infrared motion detector comprising:
   at least one infrared radiation sensor;
   at least one radiation reflecting surface, operative to direct radiation impinging thereon towards said at least one infra-red radiation sensor; and
   at least one coating layer, coating said at least one radiation reflecting surface, which is substantially reflective to far infra-red radiation and which strongly absorbs at least one of visible light and near infra-red radiation, wherein said at least one coating layer comprises black nickel.

2. An infrared motion detector according to claim 1 and wherein said at least one coating layer is deposited onto a reflective coating layer.

3. An infrared motion detector according to claim 2 and wherein said reflective coating layer comprises at least one of nickel, chrome, silver, aluminum, copper, steel, and gold.

4. An infrared motion detector according to claim 1 and wherein said at least one coating layer has a thickness in the range of 0.2 and 10 microns.

5. An infrared motion detector according to claim 1 and wherein said far infrared radiation has wavelengths in the range of 7-14 µm.

6. An infrared motion detector according to claim 1 and wherein said visible light and said near infrared radiation have wavelengths below 2 μm.

7. An infrared motion detector according to claim 1 and also comprising at least one intermediate radiation reflecting surface located along the optical path of said radiation impinging on said at least one radiation reflecting surface and operative to direct said radiation along said optical path toward said at least one infrared sensor.

8. An infrared motion detector according claim 1 and wherein said at least one radiation reflecting surface comprises a focusing mirror for far infrared radiation.

9. An infrared motion detector according to claim 7 and wherein said at least one intermediate radiation reflecting surface comprises a non-focusing mirror for far infrared radiation.

10. An infrared motion detector according to claim 7 and wherein said at least one intermediate radiation reflecting surface provides optical power for far infrared radiation.

11. A radiation reflector for use in motion detectors, to direct far infrared radiation towards an infrared radiation sensor, comprising:
at least one radiation reflecting surface;
at least one coating layer coating said radiation reflecting surface which is substantially reflective to far infrared radiation and which strongly absorbs at least one of visible light and near infrared radiation,
wherein said at least one coating layer comprises black nickel.

12. A radiation reflector according to claim 11 and wherein said at least one coating layer is deposited onto a reflective coating layer.

13. A radiation reflector according to claim 12 and wherein said reflective coating layer comprises at least one of nickel, chrome, silver, aluminum, copper, steel, and gold.

14. A radiation reflector according to claim 11 and wherein said at least one coating layer has a thickness in the range of 0.2 and 10 microns.

15. A radiation reflector according to claim 11 and wherein said far infrared radiation has wavelengths in the range of 7-14 μm.

16. A radiation reflector according to claim 11 and wherein said visible light and said near infrared radiation have wavelengths below 2 μm.

17. A radiation reflector according to claim 11 and wherein said at least one radiation reflecting surface comprises a multi-segmented mirror.

18. A radiation reflector according to claim 17 and wherein said at least one radiation reflecting surface comprises a focusing mirror for far infrared radiation.

19. A radiation reflector according to claim 17 and wherein said at least one radiation reflecting surface comprises a non-focusing mirror for far infrared radiation.

20. A radiation reflector, for use in motion detectors, to direct far infrared radiation towards an infrared radiation sensor, the radiation reflector comprising:
a substrate base made of a plastic material;
a first layer of electroless conductive coating plated over at least part of said substrate base; and
a second layer comprising black nickel electroplated over said first layer.

21. A radiation reflector according to claim 20 wherein the first layer comprises electroless nickel or electroless copper.

22. A radiation reflector according to claim 20 and wherein said second layer has a thickness in the range of 0.2 and 10 microns.

23. A radiation reflector according to claim 20 and also comprising an additional layer comprising bright acid copper electroplated over said first layer, and wherein said second layer is electroplated over said additional layer.

24. A radiation reflector according to claim 20 and also comprising an additional layer comprising bright nickel electroplated over said first layer, and wherein said second layer is electroplated over said additional layer.

25. radiation reflector according to claim 20 and also comprising:
a first additional layer comprising bright acid copper electroplated over said first layer; and
a second additional layer comprising bright nickel electroplated over said first additional layer,
wherein said second layer is electroplated over said second additional layer.

26. A radiation reflector according to claim 25 and wherein said second additional layer comprises at least one of chrome, silver, aluminum, copper, steel, and gold, having a bright finish electroplated over said second layer.

* * * * *